United States Patent [19]

Ishikuro et al.

[11] Patent Number: 5,236,738
[45] Date of Patent: Aug. 17, 1993

[54] METHOD FOR MAKING MAGNETIC RECORDING MEDIA BY KNEADING, DILUTION KNEADING, AND DISPERSING A MIXTURE OF INORGANIC GRAINS, BINDERS, AND SOLVENTS

[75] Inventors: Tadashi Ishikuro, Kanagawa; Haruo Masuda, Shizuoka, all of Japan

[73] Assignee: Fuji Photo Film Co. Ltd., Kanagawa, Japan

[21] Appl. No.: 763,482

[22] Filed: Sep. 23, 1991

Related U.S. Application Data

[63] Continuation of Ser. No. 539,403, Jun. 18, 1990, abandoned.

[30] Foreign Application Priority Data

Jun. 19, 1989 [JP] Japan .................. 1-156208

[51] Int. Cl.[5] .............................................. B05D 5/12
[52] U.S. Cl. ...................................... 427/128; 360/134; 366/301
[58] Field of Search .................. 360/134; 427/128, 182, 427/201; 366/301

[56] References Cited

U.S. PATENT DOCUMENTS

| | | | |
|---|---|---|---|
| 4,561,034 | 12/1985 | Akahane et al. | 360/134 |
| 4,612,235 | 9/1986 | Ushimaru et al. | 360/134 |
| 4,618,535 | 10/1986 | Nishimatsu et al. | 360/134 |
| 4,629,646 | 12/1986 | Ide et al. | 360/134 |
| 4,643,934 | 2/1987 | Kejimoto et al. | 360/134 |
| 4,812,330 | 3/1989 | Ishikuro et al. | 427/128 |
| 4,844,977 | 7/1989 | Nakamura et al. | 428/328 |
| 4,880,666 | 11/1989 | Ito et al. | 427/128 |
| 4,952,064 | 8/1990 | Ono et al. | 366/76 |

FOREIGN PATENT DOCUMENTS 62-41274 2/1987 Japan .

Primary Examiner—Terry J. Owens
Assistant Examiner—Benjamin L. Utech
Attorney, Agent, or Firm—Sughrue, Mion, Zinn, Macpeak & Seas

[57] ABSTRACT

A magnetic layer is overlaid on the front surface of a substrate, and a backing layer is overlaid on the back surface of the substrate. The backing layer is formed by the application of a coating composition, which contains inorganic grains and a binder, to the back surface of the substrate. The coating composition is prepared from the steps of kneading a mixture of the inorganic grains and the binder, in which the weight ratio of the inorganic grains to the binder falls within the range of 100:10 to 100:30, in a two-shaft continuous kneading and mixing machine. A dilution kneading process is then carried out on a mixture of the kneaded mixture, which results from the kneading process, and an organic solvent in a two-shaft continuous kneading and mixing machine. Thereafter a dispersion process is carried out on the diluted mixture, which results from the dilution kneading process.

6 Claims, 2 Drawing Sheets

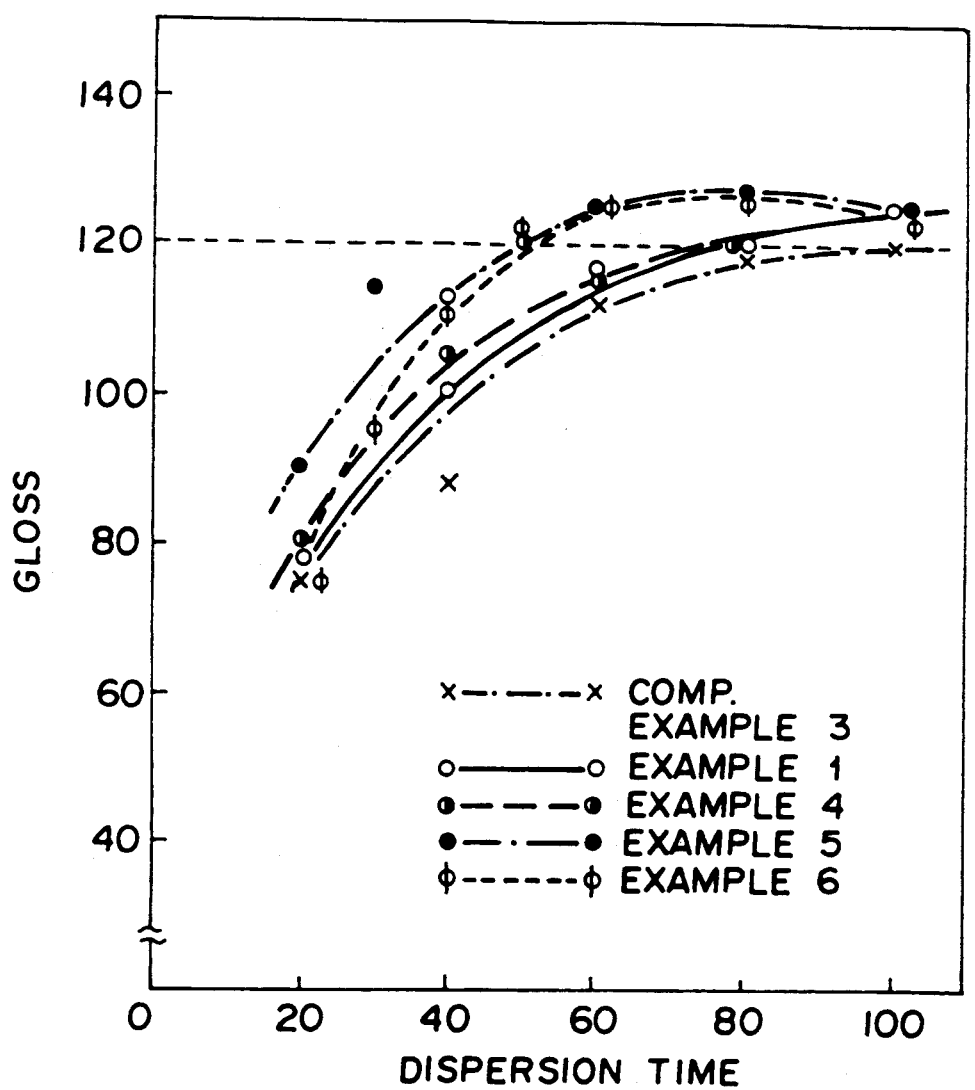

METHOD FOR MAKING MAGNETIC RECORDING MEDIA BY KNEADING, DILUTION KNEADING, AND DISPERSING A MIXTURE OF INORGANIC GRAINS, BINDERS, AND SOLVENTS

This application is a continuation of U.S. Ser. No. 07/539,403, filed Jun. 18, 1990, now abandoned.

BACKGROUND OF THE INVENTION

This invention relates to a method for making a magnetic recording medium wherein a magnetic layer is overlaid on one surface (the front surface) of a substrate, and a backing layer is overlaid on the other surface (the back surface) of the substrate. The backing layer is formed by the application of a coating composition, which contains inorganic grains and a binder, to the back surface of the substrate.

In recent years, magnetic recording media, such as audio or video magnetic recording tapes or magnetic recording tapes for computers, have often been provided with backing layers, which improves the durability of the magnetic recording media. In general, a coating composition, which contains inorganic grains and a binder, is applied to the back surface of the substrate in order to form a backing layer on the back surface of the substrate of a magnetic recording medium. The backing layer is prepared with a series of processes wherein inorganic grains and a binder are kneaded together, the kneaded mixture thus obtained is then subjected to a dilution kneading process, and the diluted mixture thus obtained is then subjected to a dispersion process.

With conventional methods for making a magnetic recording medium, in the course of preparing a coating composition used to form a backing layer, kneading machines, such as pressure type kneading machines or roll mills, are used for the kneading process and the dilution kneading process. However, with such kneading machines, it is not always possible to knead inorganic grains and a binder under a high shearing force. Also, it is difficult to dilute the kneaded mixture, which has been obtained from the kneading process, under a high shearing force. Therefore, a uniformly diluted mixture cannot be obtained. Accordingly, when the diluted mixture is thereafter subjected to a dispersion process, it will not disperse sufficiently. In cases where the coating composition thus obtained is applied to the back surface of a substrate, the backing layer which forms will have a rough surface. When a magnetic recording medium provided with such a backing layer is wound up into a roll, rough bits of the surface of the backing layer from the back surface of one loop of the roll are transferred to the magnetic layer of the next loop of the magnetic recording medium. Also, when sheets of the magnetic recording medium are stacked one upon another, rough bits of the surface of the backing layer of one sheet of the magnetic recording medium are transferred to the magnetic layer of the next sheet of the magnetic recording medium. As a result, the surface smoothness of the magnetic layer of the magnetic recording medium is affected adversely, and therefore the electromagnetic transducing characteristics of the magnetic recording medium become poor.

As disclosed in, for example, Japanese Unexamined Patent Publication No. 62(1987)-41274, it has been proposed to use a two-shaft continuous kneading and mixing machine in a kneading process and a dilution kneading process for preparing a magnetic coating composition, which is used to form a magnetic layer of a magnetic recording medium. The two-shaft continuous kneading and mixing machine may also be utilized in a kneading process and a dilution kneading process for preparing a coating composition, which is used to form the backing layer of a magnetic recording medium. When a two-shaft continuous kneading and mixing machine is used, the kneading process and the dilution kneading process can be achieved under a high shearing force. Therefore, a backing layer an be obtained which has a smooth surface and in which the inorganic grains have a high packing density.

However, inorganic grains, such as grains of carbon black, have a markedly higher porosity and a larger specific surface area with respect to grain diameters than magnetic grains, which are contained in a magnetic coating composition. Therefore, in order that a uniformly diluted mixture can be obtained with a two-shaft continuous kneading and mixing machine for preparing a coating composition, which is used to form the backing layer of a magnetic recording medium, it is necessary for the ratio of the amount of the inorganic grains to the amount of the binder during the kneading process to be different from the ratio employed during the preparation of a magnetic coating composition. Also, inorganic grains, such as grains of carbon black, have a well-grown grape-like chain structure, and therefore will not disperse easily. In order for the inorganic grains to disperse easily, only a mixture which has been diluted uniformly should be subjected to the dispersion process. Therefore, it is very important that the ratio of the amount of the inorganic grains to the amount of the binder have an appropriate value. However, it has not heretofore been clarified what the ratio of the amount of the inorganic grains to the amount of the binder should be.

SUMMARY OF THE INVENTION

The primary object of the present invention is to provide a method for making a magnetic recording medium wherein a backing layer can be overlaid on the back surface of a substrate, said backing layer having a smooth surface and containing inorganic grains whose packing density is high.

Another object of the present invention is to provide a method for making a magnetic recording medium which has good durability and good electromagnetic transducing characteristics.

In the method for making a magnetic recording medium in accordance with the present invention, in the course of preparing a coating composition, which contains inorganic grains and a binder and which is used to form the backing layer of a magnetic recording medium, a two-shaft continuous kneading and mixing machine is used during a kneading process and a dilution kneading process, so that the inorganic grains and the binder can be kneaded together and diluted under a high shearing force. Also, the ratio of the amount of the inorganic grains to the amount of the binder during the kneading process is set to a value falling within a specific range, so that the inorganic grains and the binder can be kneaded together under as high a shearing force as possible and every inorganic grain can be covered with the binder. The kneaded mixture obtained from the kneading process is then diluted such that a uniformly diluted mixture is obtained, from which a dispersion mixture having good dispersing qualities can then be obtained.

Specifically, the present invention provides a method for making a magnetic recording medium in which a magnetic layer is overlaid on the front surface of a substrate, and a backing layer is overlaid on the back surface of the substrate, the backing layer being formed by the application of a coating composition, which contains inorganic grains and a binder, to the back surface of the substrate, wherein the improvement comprises preparing the coating composition from the steps of:

i) kneading a mixture of the inorganic grains and the binder, in which the weight ratio of the inorganic grains to the binder falls within the range of 100:10 to 100:30, in a two-shaft continuous kneading and mixing machine, and thus obtaining a kneaded mixture, ii) carrying out a dilution kneading process on a mixture of the kneaded mixture, which results from the kneading process, and an organic solvent in a two-shaft continuous kneading and mixing machine, and thus obtaining a diluted mixture, and iii) thereafter carrying out a dispersion process on the diluted mixture, which results from the dilution kneading process.

With the method for making a magnetic recording medium in accordance with the present invention, in the course of preparing a coating composition, which contains inorganic grains and a binder and which is used to form the backing layer of a magnetic recording medium, a two-shaft continuous kneading and mixing machine is used for the kneading process and the dilution kneading process. Therefore, the inorganic grains and the binder can be kneaded together and diluted under a high shearing force. Also, the ratio of the amount of the inorganic grains to the amount of the binder during the kneading process is set to a value falling within the range of 100:10 to 100:30. Therefore, the inorganic grains and the binder can be kneaded together under as high a shearing force as possible such that every inorganic grain will be covered with the binder. Accordingly, the kneaded mixture obtained from the kneading process will be sufficiently kneaded, which allots a uniformly diluted mixture to be obtained from the dilution kneading process. Thereafter, from the dispersion process, a dispersion mixture having good dispersing qualities can be obtained. Accordingly, a coating composition in which the inorganic grains are both uniformly dispersed and have a high packing density can be prepared.

Therefore, with the method for making a magnetic recording medium in accordance with the present invention, the application of the coating composition, which has been prepared in the manner described above, to the back surface of the substrate, results in a backing layer having a smooth surface and containing inorganic grains whose packing density is high, said backing layer being overlaid on the back surface of the substrate.

The magnetic recording medium, which is obtained with the method for making a magnetic recording medium in accordance with the present invention and which is provided with a backing layer having a smooth surface and containing inorganic grains whose packing density is high, exhibits good durability. Also, a magnetic recording medium obtained with the method for making a magnetic recording medium in accordance with the present invention is free of the problem of rough bits of the backing layer of one loop of a magnetic recording medium which is wound up into a roll being transferred to the magnetic layer of the next loop of the magnetic recording medium. In short, a magnetic recording medium obtained with the method of the present invention does not have the problems that result when the backing layer thereof has a rough surface and the magnetic recording medium is wound up into a roll. Further, a magnetic recording medium obtained with the method for making a magnetic recording medium in accordance with the present invention is free of the problems that result when sheets of a magnetic recording medium provided with a backing layer having a rough surface are stacked one upon another. Because the backing layer has a smooth surface, rough bits of the surface of the backing layer of one sheet of the magnetic recording medium will not be transferred to the magnetic layer of the next sheet of the magnetic recording medium. Therefore, the electromagnetic transducing characteristics of the magnetic recording medium can be kept good.

BRIEF DESCRIPTION OF THE DRAWINGS

FIG. 2 is a graph showing the surface gloss values of coating films which are constituted of portions of a coating composition sampled at predetermined time intervals during a dispersion process, which is one of the processes diagramed in FIG. 1 by which a coating composition is prepared.

DETAILED DESCRIPTION OF THE INVENTION

Figure 1:
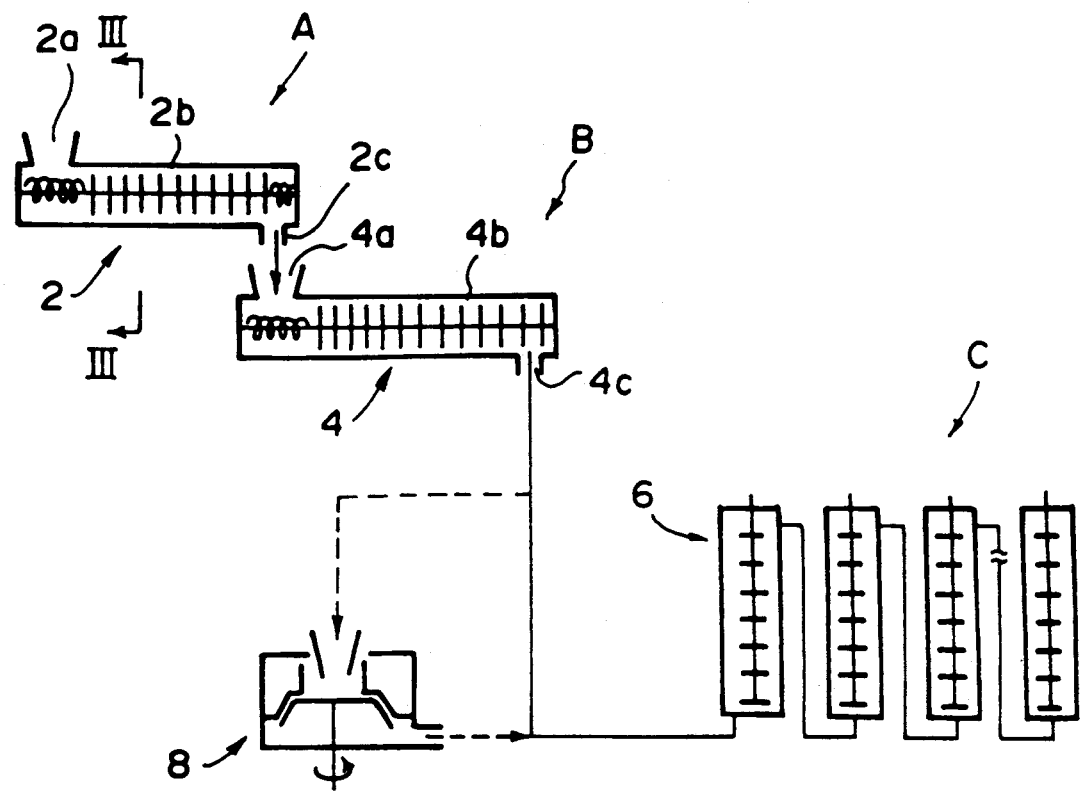
FIG. 1 is a schematic flow diagram showing processes by which a coating composition is prepared, which is used to form the backing layer of a magnetic recording medium, where an embodiment of the method for making a magnetic recording medium in accordance with the present invention is employed.

With reference to FIG. 1, reference numerals 2 and 4 denote examples of two-shaft continuous kneading and mixing machines. The two-shaft continuous kneading and mixing machine 2 comprises a mixing chamber 2b. An inlet 2a is located in the vicinity of one side edge of the mixing chamber 2b, and an outlet 2c is located in the vicinity of the other side edge of the mixing chamber 2b. Inorganic grains, a binder, and other constituents are introduced through the inlet 2a into the mixing chamber 2b and are kneaded therein. The kneaded mixture thus obtained is discharged through the outlet 2c. An addition port (not shown) is located in the vicinity of the inlet 2a. A solution, which contains a binder in an organic solvent, or the like, can be introduced through the addition port into the mixing chamber 2b.

Figure 3:
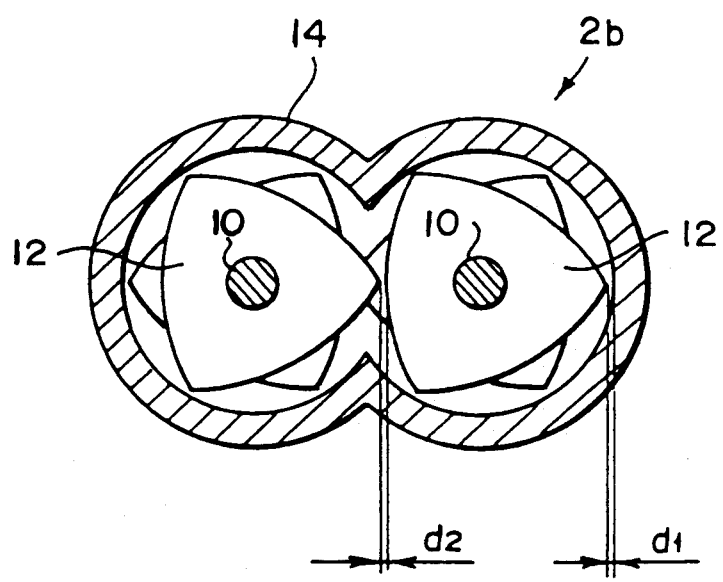
FIG. 3 is a cross-sectional view taken along line III—III of FIG. 1.

FIG. 3 shows a cross-section of the mixing chamber 2b of the two-shaft continuous kneading and mixing machine 2 shown in FIG. 1. As illustrated, the mixing chamber 2b comprises a pair of shafts 10 which are spaced a predetermined distance apart from each other and which extend in parallel, a plurality of paddles 12 which are secured to each of the shafts 10 at intervals along the direction of the axis of the shaft, and a barrel 14 in which the paddles 12 secured to the shafts 10 are accommodated. The paddles 12 are shaped in a pseudo-triangular form and have an equal size. The paddles 12 are secured to each shaft so that each paddle 12 differs in phase by an angle of 60° from the adjacent paddle 12. Also, the phase of each paddle 12 secured to one of the shafts 10 is equal to the phase of the paddle 12 which is secured to the other shaft 10 and which faces the paddle 12 secured to the one of the shafts 10. The barrel 14 has a cocoon-like cross-sectional shape so that a gap d1 having a predetermined width exists between the inner surface of the barrel 14 and the tip of each paddle 12. The pseudotriangular shape of the paddles 12 is selected so that there will be a gap d2 having a predetermined width between each paddle 12 secured to one of the shafts 10 and the paddle 12 which is secured to the other shaft 10 and which faces said paddle 12 secured to said one shaft 10.

During the kneading process, the ratio of the amount of the inorganic grains to the amount of the binder is set to a value falling within the range of 100:10 to 100:30. During this process, an organic solvent, or the like, may be added to the inorganic grains and the binder. If the ratio of the amount of the binder to the amount of the inorganic grains is smaller than 10:100, the inorganic grains cannot be sufficiently covered with the binder during the kneading process. If the ratio of the amount of the binder to the amount of the inorganic grains is larger than 30:100, the elasticity of the mixture of the binder and the inorganic grains will become too high, and a high shearing force will not be obtained during the kneading process.

The inorganic grains may be constituted of carbon black, graphite, molybdenum disulfide, tungsten disulfide, boron nitride, $SiO_2$, $CaCO_3$, $Al_2O_3$, $Fe_2O_3$, $TiO_2$, MaO, ZnO, or CaO, among which carbon black is preferable. The sizes of the inorganic grains should preferably fall within the range of 10 nm to 50 nm. In cases where carbon black grains are used as the inorganic grains, $\alpha$-$Al_2O_3$ grains may be added as a filler to the carbon black grains in a proportion falling within the range of 0.5 to 50 parts by weight per 100 parts by weight of the carbon black grains, and preferably in a proportion falling within the range of 0.5 to 30 parts by weight per 100 parts by weight of the carbon black grains. The sizes of the $\alpha$-$Al_2O_3$ grains should preferably fall within the range of 0.05 $\mu$m to 5 $\mu$m. The weight ratio of the filler to the binder should fall within the range of 0.1 to 40 parts per part of the binder, and preferably within the range of 0.2 to 20 parts per part of the binder.

The binder may be a vinyl chloride copolymer, for example, a vinyl chloride - vinyl acetate copolymer, a vinyl chloride - vinyl acetate - vinyl alcohol copolymer, a vinyl chloride - vinyl acetate - acrylic acid copolymer, a vinyl chloride - vinyl acetate - vinylidene chloride copolymer, a vinyl chloride - acrylonitrile copolymer, an ethylene - vinyl acetate copolymer, or a vinyl chloride copolymer incorporated with a polar group such as a hydroxyl group, a —COOH group, an amino group, a phosphate group, a —$SO_3Na$ group or a —$SO_2Na$ group, and an epoxy group: a cellulose derivative such as a nitrocellulose resin; an acrylic resin; a polyvinyl acetal resin; a polyvinyl butyral resin; an epoxy resin; a phenoxy resin; a polyester resin; a polyurethane resin, for example, a polyester polyurethane resin, a polyurethane resin incorporated with a polar group such as a hydroxyl group, a —COOH group, an amino group, a phosphate group, a —$SO_3Na$ group or a —$SO_2Na$ group, or a polycarbonate polyurethane resin.

As described above, an organic solvent may be added to the inorganic grains and the binder. As the organic solvent, any solvent, which is ordinarily employed during the preparation of a magnetic coating composition, may be used. By way of example, the solvent may be a ketone such as methyl ethyl ketone, cyclohexanone, diethyl ketone, methyl isobutyl ketone or acetone; an ester such as ethyl acetate or butyl acetate; an aromatic solvent such as toluene or xylene; or an alcohol such as methanol, ethanol, propanol or butanol. These solvents may be used alone or in combination.

The substrate may be constituted of any known appropriate material and may have any known appropriate shape. For example, the substrate may be constituted of a plastic material, such as polyethylene terephthalate, a metal, or a ceramic material. The substrate may have a tape-, disk-, or drum-like shape. If necessary, the substrate can be pre-treated before being used.

The magnetic layer comprises a binder and ferromagnetic grains dispersed therein. By way of example, $\gamma$-iron oxide ferromagnetic grains, cobalt-containing $\gamma$-iron oxide ferromagnetic grains, ferromagnetic metal grains, barium ferrite grains, or strontium ferrite grains may be used as the ferromagnetic grains.

The present invention will further be illustrated by the following nonlimitative examples.

EXAMPLE 1

A coating composition was prepared with the processes shown in FIG. 1. The coating composition was then applied to the back surface of a substrate having a front surface on which a magnetic layer had been overlaid. In this manner, a backing layer having a thickness falling within the range of 0.6 $\mu$m to 1.0 $\mu$m in its dry state was formed on the back surface of the substrate.

The processes for preparing the coating composition used to form the backing layer were composed of a kneading process A, a dilution kneading process B, and a dispersion process C. The kneading process A was carried out with the two-shaft continuous kneading and mixing machine 2. The dilution kneading process B was carried out with the two-shaft continuous kneading and mixing machine 4. The dispersion process C was carried out with a plurality of sand grinders 6 which were connected in series with one another.

First, the kneading process A was carried out. In the course of carrying out the kneading process A, carbon black grains serving as inorganic grains, a vinyl chloride - vinyl acetate copolymer resin serving as a binder, and methyl ethyl ketone (MEK) serving as an organic solvent were simultaneously fed through the inlet 2a into the two-shaft continuous kneading and mixing machine 2, and kneaded together in the mixing chamber 2b having the configuration shown in FIG. 3. The kneaded mixture obtained from the kneading process was discharged through the outlet 2c. During the kneading process, the carbon black grains were used in an amount of 100 parts by weight, and the vinyl chloride - vinyl acetate copolymer resin was used in an amount of 20 parts by weight. Methyl ethyl ketone was used in an amount such that the solids concentration in the kneaded mixture was 85%.

Thereafter, the dilution kneading process B was carried out. In the course of carrying out the dilution kneading process B, the kneaded mixture which had been discharged from the outlet 2c, a polyurethane resin, and a predetermined amount of methyl ethyl ketone were fed through an inlet 4a into the two-shaft continuous kneading and mixing machine 4, and subjected to dilution kneading in a mixing chamber having the same configuration as that of the mixing chamber 2b shown in FIG. 3. A predetermined amount of methyl ethyl ketone was then added during the dilution kneading process B. The diluted mixture obtained from the dilution kneading process B was discharged from an outlet 4c of the two-shaft continuous kneading and mixing machine 4. During the dilution kneading process B, the polyurethane resin was used in an amount of 20 parts by weight. The amount of methyl ethyl ketone, which was fed into the two-shaft continuous kneading and mixing machine 4 simultaneously with the polyurethane resin, was selected such that the solids concentration in the diluted mixture was 60%. The amount of methyl ethyl ketone, which was added later, was selected such that the solids concentration in the diluted mixture was 30%.

The dispersion process C was thereafter carried out. In the course of carrying out the dispersion process C, the diluted mixture which had been discharged from the outlet 4c, a polyester resin, a polyisocyanate resin, and a predetermined amount of methyl ethyl ketone were fed into the series of sand grinders 6 and subjected to the dispersion process. In this manner, the processes for preparing the coating composition for the backing layer were completed. During the dispersion process C, the polyester resin was used in an amount of 5 parts, and the polyisocyanate resin was used in an amount of 15 parts.

During the processes for preparing the coating composition for the backing layer, Valcan XC-72 supplied by Cavot K.K. was employed as the carbon black grains, and DX-860 supplied by Denki Kagaku Kogyo K.K. was employed as the vinyl chloride - vinyl acetate copolymer resin. Also, N-2301 supplied by Nippon Polyurethane K.K. was employed as the polyurethane resin, and Stafix supplied by Fuji Photo Film Co., Ltd. was employed as the polyester resin. The polyisocyanate resin employed was Coronate L supplied by Nippon Polyurethane K.K.

EXAMPLE 2

A backing layer was overlaid on the back surface of a substrate in the same manner as in Example 1, except that the amount of the vinyl chloride - vinyl acetate copolymer resin fed through the inlet 2a during the kneading process A was 10 parts by weight.

EXAMPLE 3

A backing layer was overlaid on the back surface of a substrate in the same manner as in Example 1, except that the amount of the vinyl chloride - vinyl acetate copolymer resin fed through the inlet 2a during the kneading process A was 30 parts by weight.

EXAMPLE 4

During the kneading process A, only the carbon black grains and the vinyl chloride - vinyl acetate copolymer resin were simultaneously fed through the inlet 2a. The carbon black grains and the vinyl chloride - vinyl acetate copolymer resin were then mixed in the mixing chamber 2b. At a predetermined position in the mixing chamber 2b, through which the mixture passed 10 seconds after the mixing had begun, methyl ethyl ketone was added in a predetermined amount such that the solids concentration in the kneaded mixture was 85%. In this manner, the kneading process A was carried out. The dilution kneading process B and the dispersion process C were carried out in the same manner as in Example 1. In this manner, a backing layer was overlaid on the back surface of a substrate.

EXAMPLE 5

A backing layer was overlaid on the back surface of a substrate in the same manner as in Example 4, except that methyl ethyl ketone was added 30 seconds after the mixing of the carbon black grains and the vinyl chloride - vinyl acetate copolymer resin had begun during the kneading process A.

EXAMPLE 6

A backing layer was overlaid on the back surface of a substrate in the same manner as in Example 4, except that methyl ethyl ketone was added 60 seconds after the mixing of the carbon black grains and the vinyl chloride - vinyl acetate copolymer resin had begun during the kneading process A.

EXAMPLE 7

A backing layer was overlaid on the back surface of a substrate in the same manner as in Example 5, except that the diluted mixture, which was discharged from the outlet 4c, was processed in a stone mill 8 shown in FIG. 1 and was then fed into the series of sand grinders 6, 6, . . .

EXAMPLE 8

A backing layer was overlaid on the back surface of a substrate in the same manner as in Example 5, except that the total amount of methyl ethyl ketone, which was added during the dilution kneading process B, was divided into three portions, and the addition of methyl ethyl ketone was carried out in three steps. In the first step, methyl ethyl ketone was added in an amount such that the solids concentration in the diluted mixture was 75%. In the second step, methyl ethyl ketone was added in an amount such that the solids concentration in the diluted mixture was 55%. In the third step, methyl ethyl ketone was added in an amount such that the solids concentration in the diluted mixture was 30%.

COMPARATIVE EXAMPLE 1

A backing layer was overlaid on the back surface of a substrate in the same manner as in Example 1, except that the amount of the vinyl chloride - vinyl acetate copolymer resin fed through the inlet 2a during the kneading process A was 5 parts by weight.

COMPARATIVE EXAMPLE 2

A backing layer was overlaid on the back surface of a substrate in the same manner as in Example 1, except that the amount of the vinyl chloride - vinyl acetate copolymer resin fed through the inlet 2a during the kneading process A was 40 parts by weight.

COMPARATIVE EXAMPLE 3

The carbon black grains, the vinyl chloride - vinyl acetate copolymer resin, and methyl ethyl ketone were fed into a roll mill and kneaded therein. The kneaded mixture obtained from the kneading process, the polyurethane resin, and a predetermined amount of methyl ethyl ketone were fed into a dispersing tank, subjected to a dilution process, and thereby converted into liquid form. The dispersion process C was carried out in the same manner as in Example 1. In this manner, a backing layer was overlaid on the back surface of a substrate.

The amount of the carbon black grains fed into the roll mill was 100 parts by weight, and the amount of the vinyl chloride - vinyl acetate copolymer resin fed into the roll mill was 20 parts by weight. Methyl ethyl ketone was fed into the roll mill in an amount such that the solids concentration in the kneaded mixture was 85%. The amount of the polyurethane resin fed into the dispersing tank was 20 parts by weight. Methyl ethyl ketone was fed into the dispersing tank in an amount such that the solids concentration in the diluted mixture was 30%.

COMPARATIVE EXAMPLE 4

The carbon black grains, the vinyl chloride - vinyl acetate copolymer resin, and methyl ethyl ketone were fed into a pressure type kneading machine and kneaded therein. Thereafter, the polyurethane resin and a predetermined amount of methyl ethyl ketone were added little by little to the mixture, which was being kneaded in the pressure type kneading machine. The mixture thus obtained was subjected to a dilution kneading process, and converted thereby into slurry form. The dispersion process C was carried out in the same manner as in Example 1. In this manner, a backing layer was overlaid on the back surface of a substrate.

The amount of the carbon black grains fed into the pressure type kneading machine was 100 parts by weight, and the amount of the vinyl chloride - vinyl acetate copolymer resin fed into the pressure type kneading machine was 20 parts by weight. Methyl ethyl ketone was fed into the pressure type kneading machine in an amount such that the solids concentration in the kneaded mixture was 85%. The amount of the polyurethane resin, which was fed into the pressure type kneading machine during the dilution kneading process, was 20 parts by weight. During the dilution kneading process, methyl ethyl ketone was fed into the pressure type kneading machine in an amount such that the solids concentration in the diluted mixture was 30%.

EVALUATION OF EXAMPLES AND COMPARATIVE EXAMPLES

The tape-like magnetic recording media, which were provided with backing layers formed in the manners described in Examples 1 through 8 and Comparative Examples 1 through 4, were slit into samples having predetermined widths. For the samples, the video S/N ratio and the drop-out rate were measured. Table 1 shows the conditions, under which the measurements were carried out, and the results of the measurements.

TABLE 1

| | Machine | Weight ratio of inorganic grains to the binder during the kneading process | Mixing time (sec.) | Concentration (%) Kneading | 1st dilution | 2nd dilution | 3rd dilution | Stone mill | Video S/N (dB) | Drop-out rate (spots/min.) |
|---|---|---|---|---|---|---|---|---|---|---|
| Example | | | | | | | | | | |
| 1 | Two-shaft continuous kneading and mixing machine | 100:20 | 0 | 85 | 60 | 30 | — | Not used | 0.7 | 40 |
| 2 | Two-shaft continuous kneading and mixing machine | 100:10 | 0 | " | " | " | — | " | 1.0 | 50 |
| 3 | Two-shaft continuous kneading and mixing machine | 100:30 | 0 | " | " | " | — | " | 1.0 | 40 |
| 4 | Two-shaft continuous kneading and mixing machine | 100:20 | 10 | " | " | " | — | " | 0.9 | 30 |
| 5 | Two-shaft continuous kneading and mixing machine | " | 30 | " | " | " | — | " | 1.1 | 30 |
| 6 | Two-shaft continuous kneading and mixing machine | " | 60 | " | " | " | — | " | 1.1 | 20 |
| 7 | Two-shaft continuous kneading and mixing machine | " | 30 | " | " | " | — | Used | 1.3 | 20 |
| 8 | Two-shaft continuous kneading and mixing machine | " | 30 | " | 75 | 55 | 30 | Not used | 1.5 | 10 |
| Comp. Ex. | | | | | | | | | | |
| 1 | Two-shaft continuous kneading and mixing machine | 100:5 | 0 | " | 60 | 30 | — | " | 0.1 | 50 |
| 2 | Two-shaft continuous kneading and mixing machine | 100:40 | 0 | " | " | " | — | " | 1.5 | More than 200 |
| 3 | Roll mill | 100:20 | — | " | 30 | — | — | " | −0.5 | 150 |
| 4 | Pressure type kneading | " | — | " | Continuous dilution to 30% | | | " | −0.4 | More than 200 |

TABLE 1-continued

| Machine | Weight ratio of inorganic grains to the binder during the kneading process | Mixing time (sec.) | Kneading | Concentration (%) | | | Stone mill | Video S/N (dB) | Drop-out rate (spots/min.) |
|---|---|---|---|---|---|---|---|---|---|
| | | | | 1st dilution | 2nd dilution | 3rd dilution | | | |
| machine | | | | | | | | | |

Video S/N: The S/N ratio was measured with a noise meter (925 C supplied by Shibasoku K.K.) with reference to Super XGT-120 supplied by Fuji Photo Film Co., Ltd. Noise was measured with a high-pass filter (10 kHz) and a low-pass filter (4 MHz). The VTR used was NV-8300 supplied by Matsushita Electric Industrial Co., Ltd.
Drop-Outs: A tape sample was repeatedly run (250 passes) in a VHS type tape deck. Thereafter, the drop-out rate per minute was measured at 15 μsec., −20 dB with a drop-out counter (VD-3D supplied by Victor Company of Japan Ltd.).

In general, the allowable level of the video S/N ratio is 0.5 dB or higher, and preferably 1.0 dB or higher. The allowable level of the drop-out rate is 50 spots/minute or lower, and preferably 30 spots/minutes or lower. As will be clear from Table 1, the magnetic recording media having the backing layers formed in Examples 1 through 8 exhibited allowable levels of noise and had allowable drop-out rates. It is thought that this is because the kneading process and the dilution kneading process using the two-shaft continuous kneading and mixing machines can be carried out under a higher shearing force than when a roll mill or a pressure type kneading machine is used as in Comparative Examples 3 and 4. However, as will be clear from the results of Comparative Examples 1 and 2, even when the two-shaft continuous kneading and mixing machines are employed, good results cannot be obtained if the ratio of the amount of the inorganic grains to the amount of the binder during the kneading process does not fall within the specified range. This is presumably because, if the ratio of the amount of the binder to the amount of the inorganic grains is smaller than 10:100, the inorganic grains cannot be sufficiently covered with the binder during the kneading process. If the ratio of the amount of the binder to the amount of the inorganic grains is larger than 30:100, a high shearing force cannot be given to the inorganic grains during the kneading process.

As will be clear from the results of Examples 4, 5, and 6, better results were obtained when the inorganic grains and the binder were mixed together without the organic solvent being added prior to the kneading operation than when the mixing operation was not carried out prior to the kneading operation (Example 1). Also, when the mixing operation was carried out for a longer time, better results were obtained. This is presumably because the inorganic grains are compressed by the high shearing force during the mixing operation, and therefore the mixture can then be uniformly kneaded, diluted, and dispersed.

As will be clear from the results of Example 7, the process using the stone mill should preferably be carried out prior to the dispersion process. Also, as will be clear from the results of Example 8, the dilution with the organic solvent during the dilution kneading process should preferably be carried out gradually.

In Examples 1, 4, 5, and 6 and Comparative Example 3, during the dispersion process, the dispersion mixture was sampled at predetermined time intervals. Coating films were then formed from the samples of the dispersion mixture, and the surface gloss values of the coating films were measured. FIG. 2 shows the results of the measurements.

We claim:

1. A method for making a magnetic recording medium in which a magnetic layer is overlaid on a front surface of a substrate, and a backing layer is overlaid on a back surface of the substrate, the backing layer being formed by the application of a coating composition, which contains inorganic grains and a binder, to the back surface of the substrate, wherein said method comprises the steps of:
    (a) preparing the coating composition form the steps of
        i) carrying out a kneading process by kneading a mixture of the inorganic grains and the binder, in which a weight ratio of the inorganic grains to the binder falls within a range of 100:10 to 100:30, in a two-shaft continuous kneading and mixing machine to obtain a kneaded mixture,
        ii) carrying out a dilution kneading process on a mixture of the kneaded mixture and an organic solvent in a two-shaft continuous kneading and mixing machine to obtain a diluted mixture, and
        iii) thereafter carrying out a dispersion process on the diluted mixture by mixing the diluted mixture with at least one additional material in a series of sand grinders to produce the coating composition; and
    (b) applying the coating composition to the back surface of the substrate.

2. A method as defined in claim 1 wherein said inorganic grains are constituted of carbon black.

3. A method as defined in claim 2, wherein the sizes of said inorganic grains fall within the range of 10 μm to 50 μm.

4. A method as defined in claim 1 wherein, during the kneading process, said inorganic grains and said binder are mixed together without any organic solvent being added thereto to obtain a first mixture, an organic solvent is then added to the first mixture of said inorganic grains and said binder to obtain a second mixture, and thereafter the second mixture is kneaded to obtain the kneaded mixture.

5. A method as defined in claim 1 wherein the diluted mixture is processed in a stone mill and is then subjected to the dispersion process.

6. A method as defined in claim 1 wherein, during the dilution kneading process, an organic solvent is gradually added to the kneaded mixture.

* * * * *